US010956056B2

(12) United States Patent
Ridgway et al.

(10) Patent No.: US 10,956,056 B2
(45) Date of Patent: Mar. 23, 2021

(54) APPLYING DYNAMIC ROUTING PROTOCOLS TO ROUTE DSN ACCESS REQUESTS

(71) Applicant: International Business Machines Corporation, Armonk, NY (US)

(72) Inventors: William Richard Ridgway, Chicago, IL (US); Thu Danh, Hoffman Estates, IL (US); David A. Bukiet, La Grange, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 13 days.

(21) Appl. No.: 16/428,537

(22) Filed: May 31, 2019

(65) Prior Publication Data

US 2020/0379657 A1    Dec. 3, 2020

(51) Int. Cl.
    *G06F 3/06*    (2006.01)
(52) U.S. Cl.
    CPC ............ *G06F 3/0622* (2013.01); *G06F 3/067* (2013.01); *G06F 3/0635* (2013.01)
(58) Field of Classification Search
    CPC ....... G06F 3/0622; G06F 3/0635; G06F 3/067
    USPC ......................................................... 709/245
    See application file for complete search history.

(56) References Cited

U.S. PATENT DOCUMENTS

| 7,362,709 B1 | 4/2008 | Hui et al. |
| 7,610,383 B2 | 10/2009 | Britto et al. |
| 9,253,075 B2 | 2/2016 | Jacobson et al. |
| 10,038,626 B2 | 7/2018 | Sorenson, III et al. |

(Continued)

FOREIGN PATENT DOCUMENTS

WO    9922492    2/2016

OTHER PUBLICATIONS

Gottlieb, et al.; Automated Provisioning of BGP Customers; IEEE Network; Nov.-Dec. 2003; pp. 44-55; vol. 17, Iss 6.

*Primary Examiner* — Nicholas R Taylor
*Assistant Examiner* — Chong G Kim
(74) *Attorney, Agent, or Firm* — James Nock; Andrew D. Wright; Roberts Calderon Safran & Cole, P.C.

(57) ABSTRACT

A method for execution by one or more processing modules of one or more computing devices of a dispersed storage network (DSN), the method begins by determining, in advance of a DSN data access request, an optimal routing configuration for the DSN data access request to a collection of one or more DS processing units. The method continues by assigning a final destination identifier (FDI) to the collection of one or more DS processing units. The method continues by associating a request router with the collection of one or more DS processing units and distributing the optimal routing configuration to each of the collection of one or more DS processing units and to the associated request router. The method continues by receiving, by the associated request router, a request to access DSN data located in a DSN memory, wherein the request includes at least the FDI and routing, by the request router, the DSN data access request to the collection of one or more DS processing units according to the optimal routing configuration. The DS processing units will then process the DSN data access request for a storage unit where the data is stored (read) or is to be stored (write).

20 Claims, 8 Drawing Sheets

(56) References Cited

U.S. PATENT DOCUMENTS

| | | |
|---|---|---|
| 10,164,881 B2 | 12/2018 | Tubaltsev et al. |
| 10,412,156 B1 * | 9/2019 | Dickinson ........... H04L 67/1021 |
| 2018/0109450 A1 | 4/2018 | Filsfils et al. |
| 2018/0359154 A1 | 12/2018 | Millner |
| 2019/0028536 A1 | 1/2019 | Chauhan |

* cited by examiner

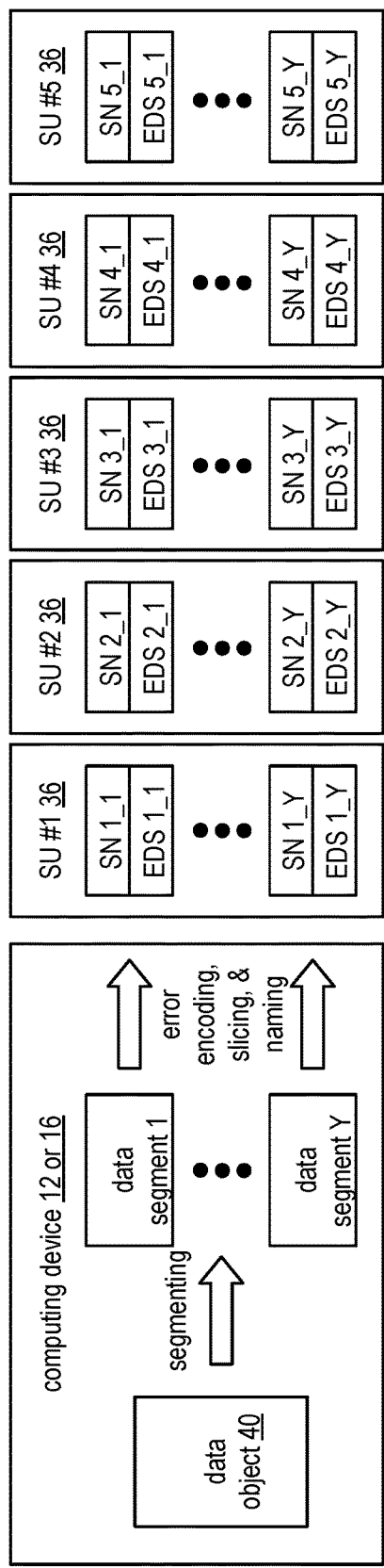
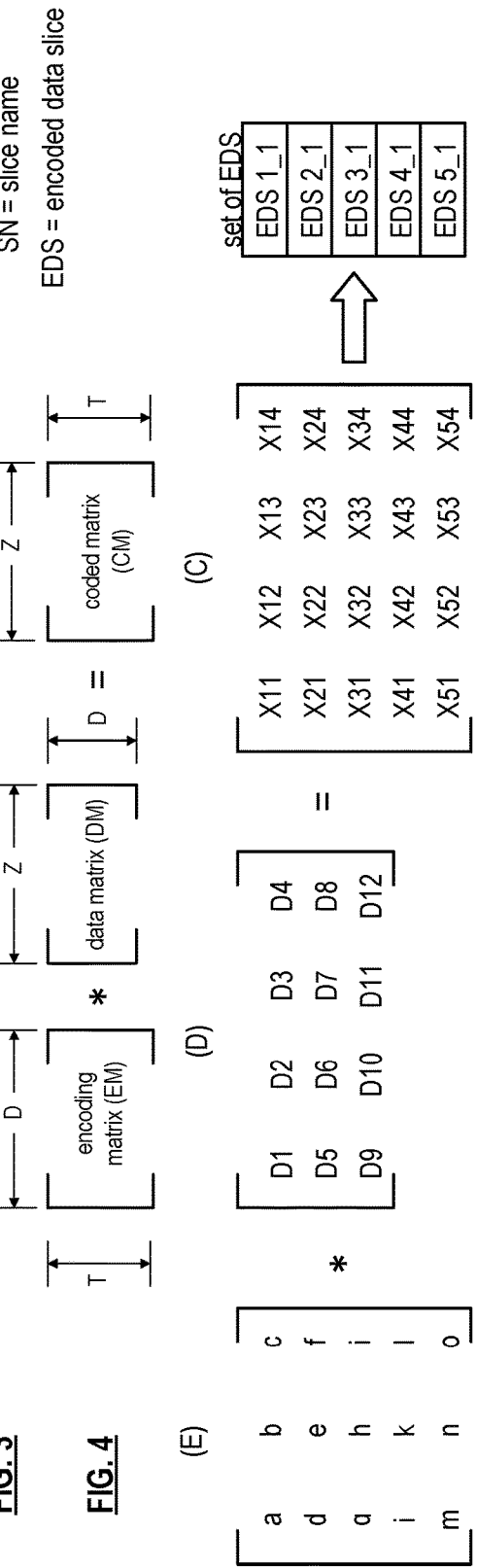
FIG. 3
FIG. 4
FIG. 5
FIG. 6

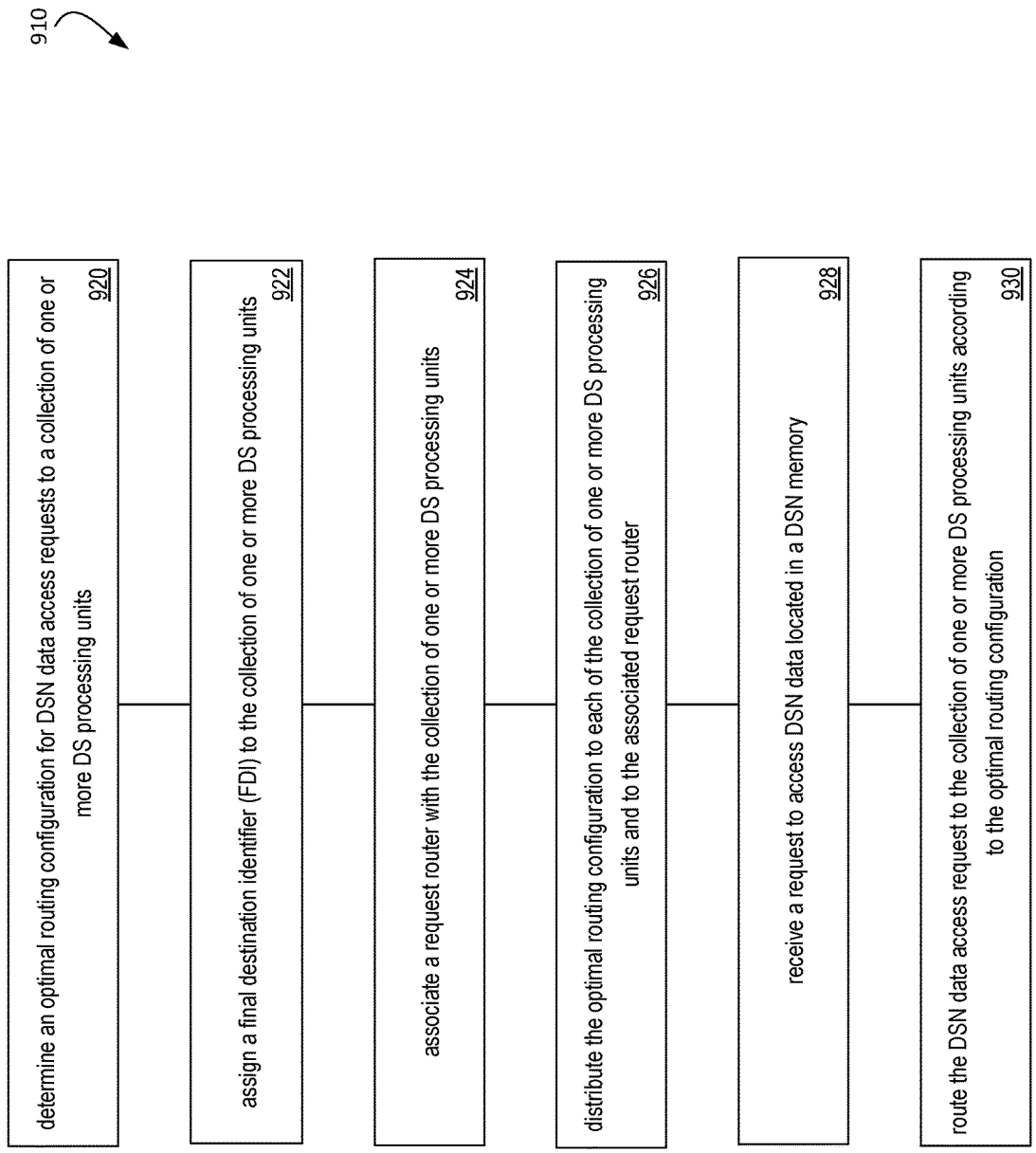

APPLYING DYNAMIC ROUTING PROTOCOLS TO ROUTE DSN ACCESS REQUESTS

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work-stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9C is a flowchart illustrating an example of processing unit routing in accordance with the present invention.

DETAILED DESCRIPTION OF THE INVENTION

Figure 1:
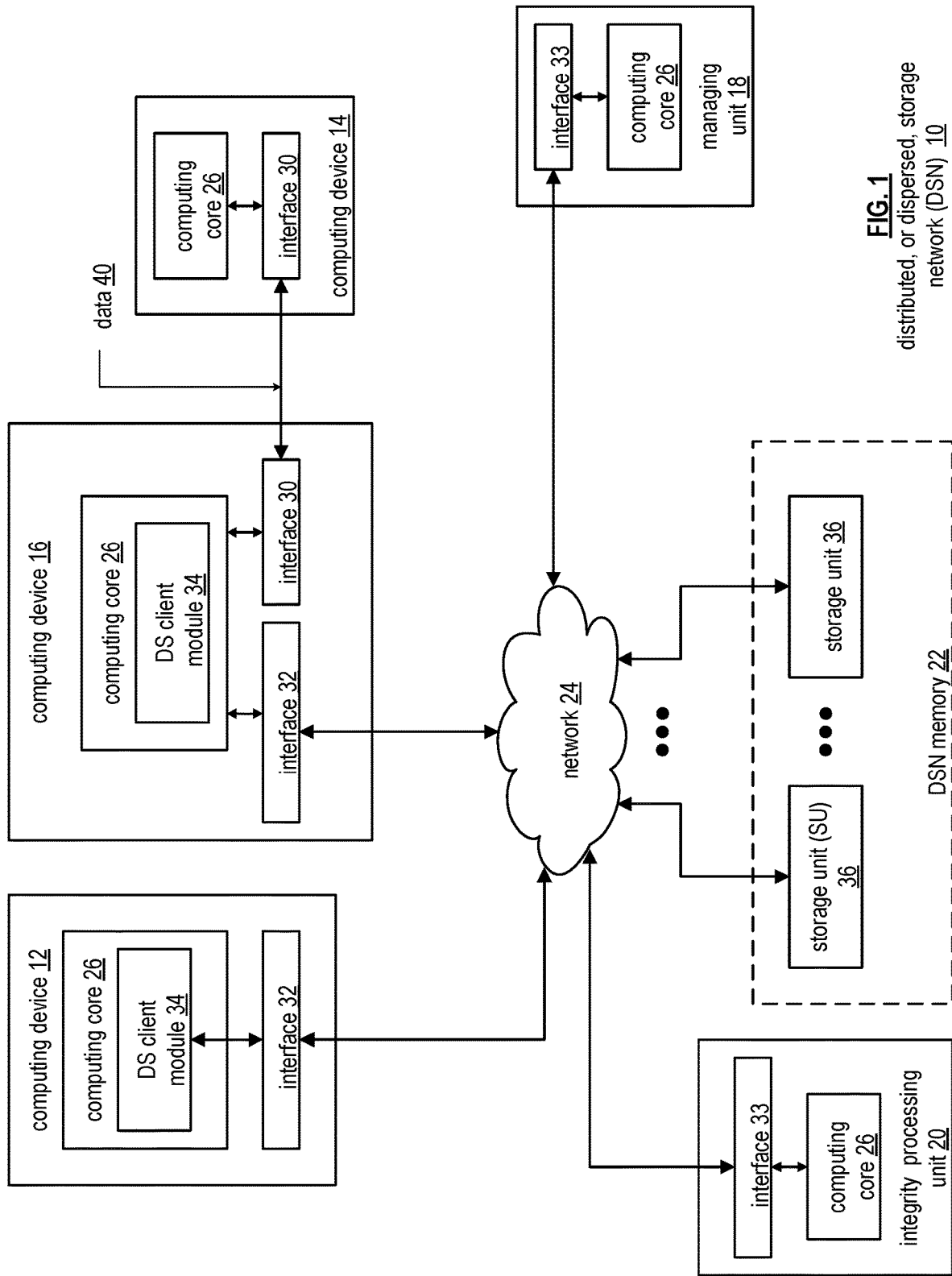
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
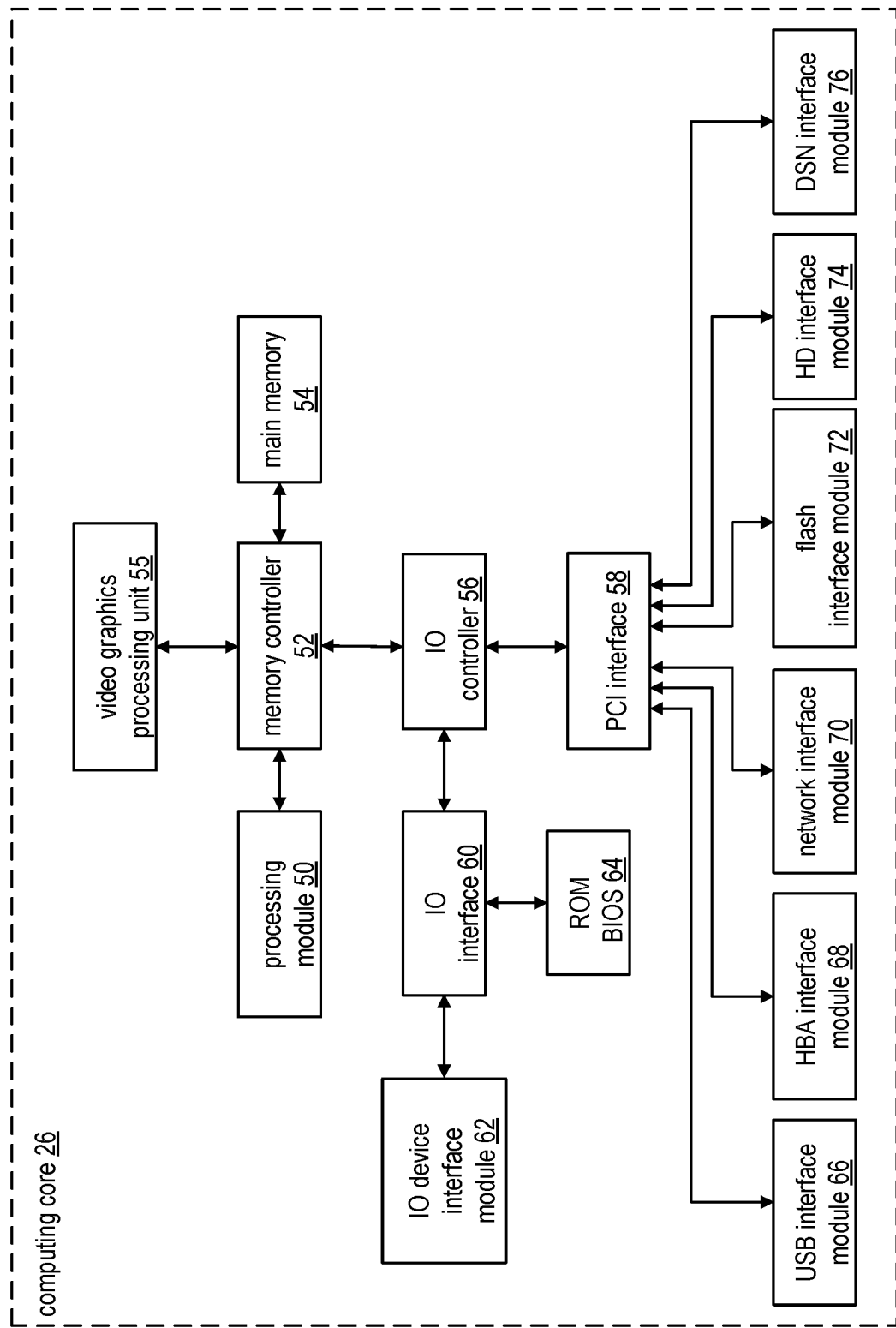
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9C. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
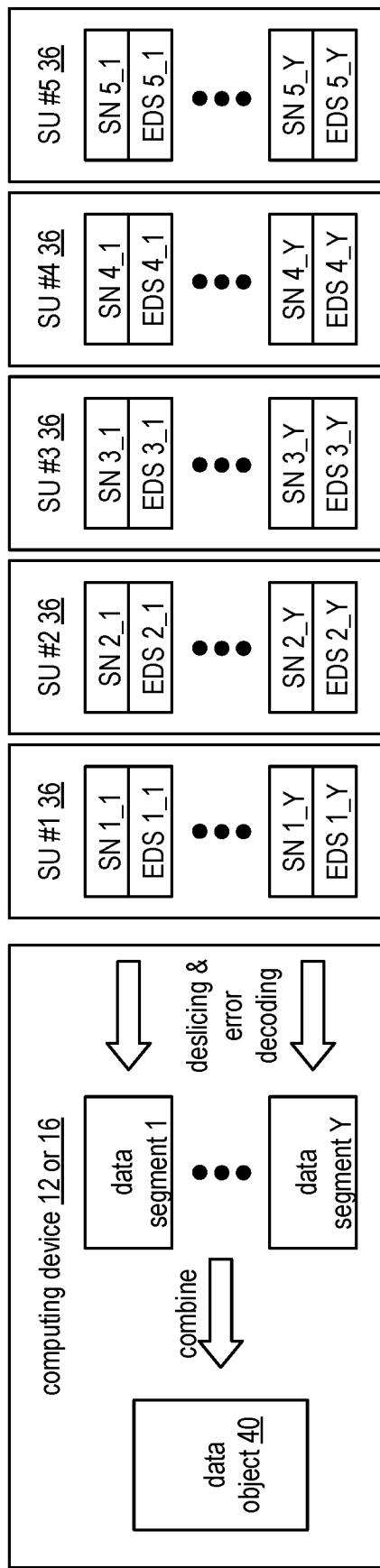
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
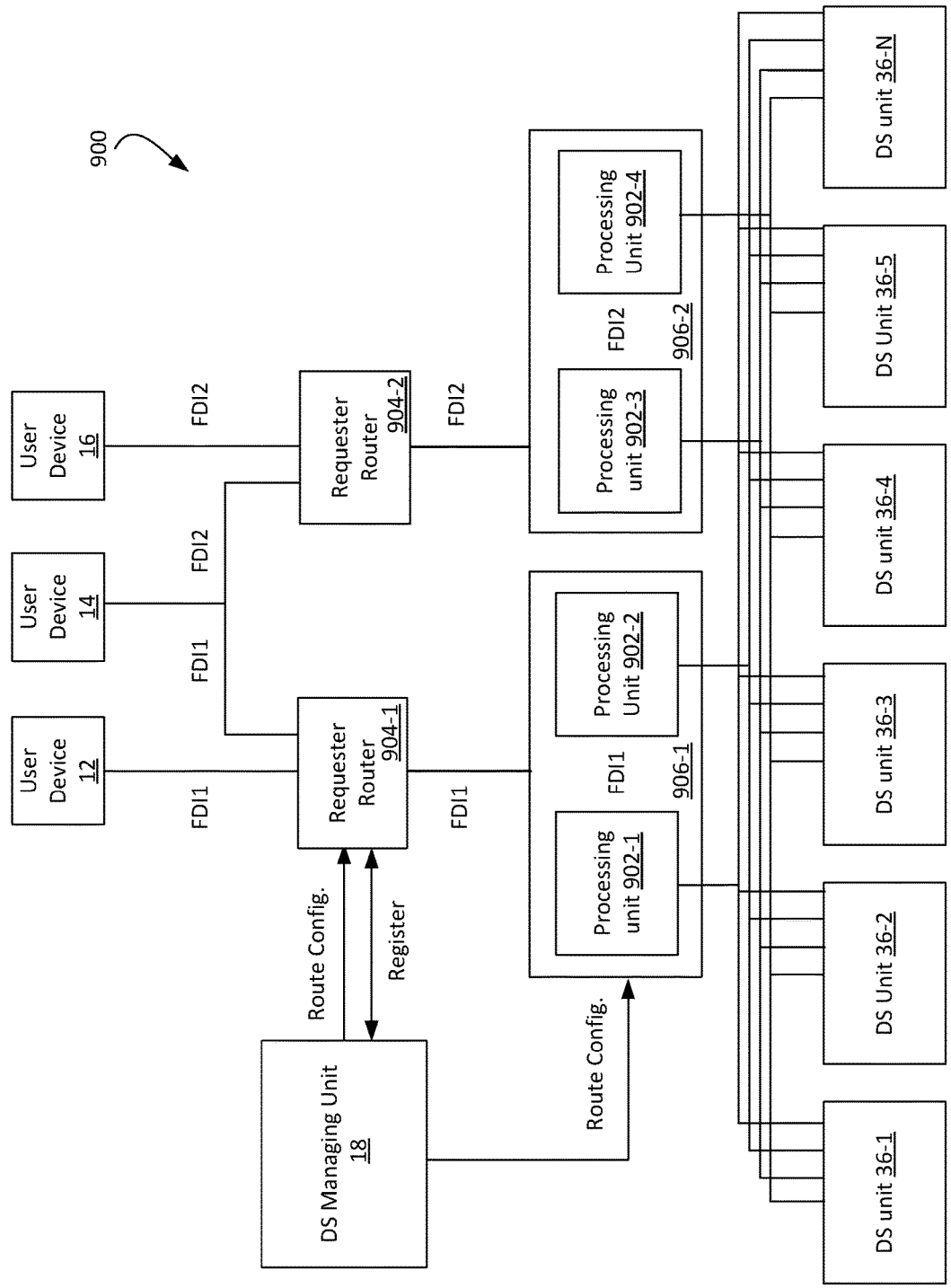
FIG. 9 is a schematic block diagram of a DSN memory configuration with processing unit routing in accordance with the present invention.

FIG. 9 is a schematic block diagram of a DSN memory configuration 900 with optimal routing configurations. DSN memory 22 consists of DS units (storage units 36), DS processing units 902, and a DS management unit 18. For performance and availability reasons, a DSN memory will often have multiple DS processing units 902 (1-4, et al.), and a set of DS processing units may change over time (e.g., adding new ones to increase throughput capacity, or replacing failed or outdated ones). This changing set of processing units creates a burden for DSN data access requesters (user/computing devices 12, 14 or 16) as they may not be informed of the latest list of DS processing units, nor know which ones are available currently, or which would be the fairest one to send their request(s) to. To address this problem, a requester router 904 (1-2, et al.) is introduced which enables DSN data requesters to reference a collection of DS processing units via a common "Final Destination Identifier" (FDI), a logical network address which is shared by at least one DS processing unit. As shown, processing units 1 and 2 (902-1 and 902-2) are part of a first collection 906-1 and processing units 3 and 4 (902-3 and 902-4) are part of second collection 906-2. Collection 906-1 is identified by FDI1, while collection 906-2 is identified by FDI2. While illustrated in discrete numbers, any number of storage units, processing units, collections of processing units, requester routers and DS managing units can be included without departing from the scope of the technology described herein.

Figure 9A:
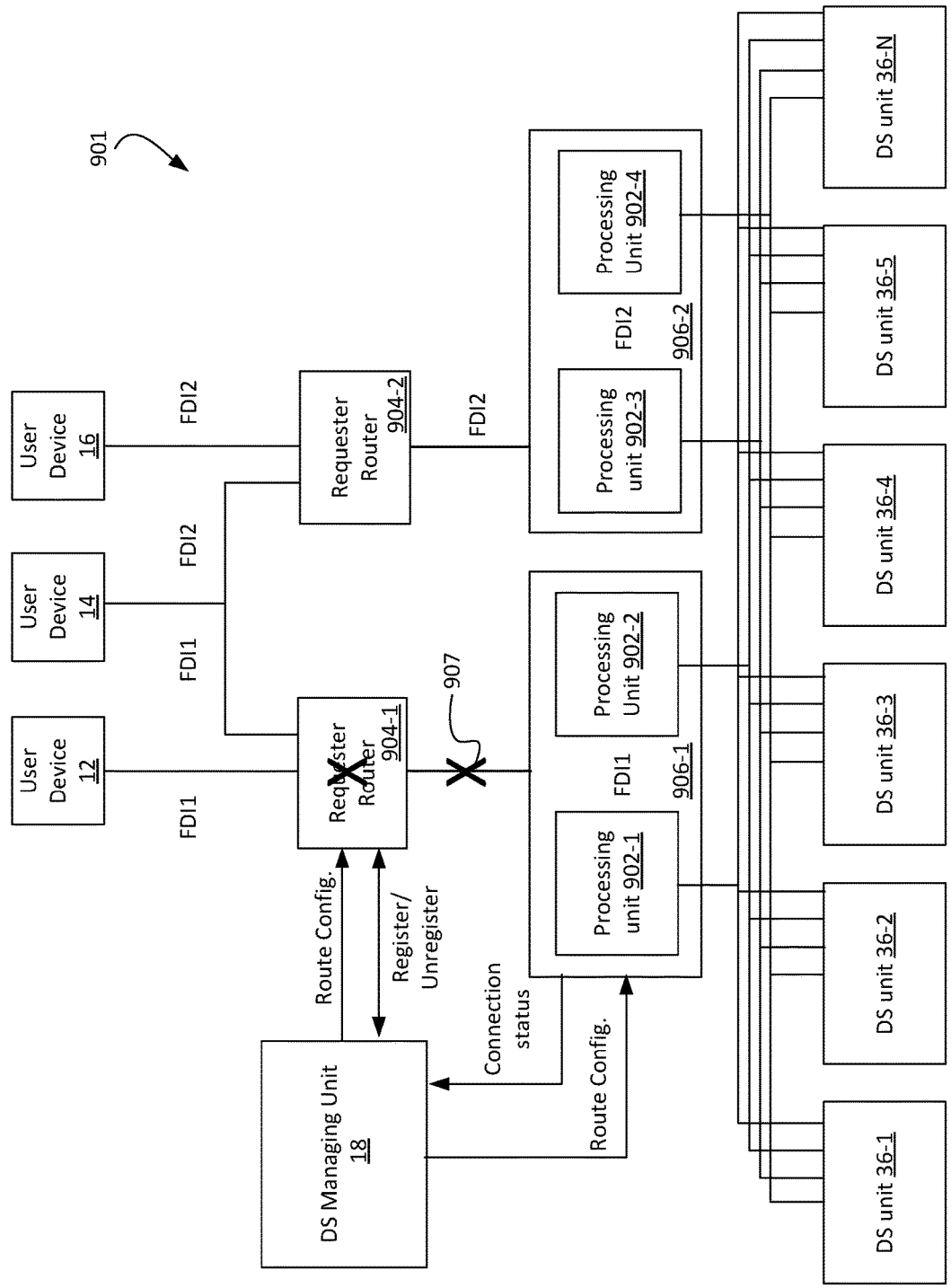
FIG. 9A is another schematic block diagram of a DSN memory configuration with processing unit routing in accordance with the present invention.

A DSN that makes use of request routers 904 (1-2) begins with a DS management unit 18 making a determination of the desired routing configuration (optimal routing configuration). An optimal routing configuration considers which Network Identifiers (NIs) are associated with which network entities, for example, which DS processing units share a common FDI, which Load Balancing Algorithm (LBA) should be used, which request routers each DS processing unit should register their FDI with, and in a system with multiple layers of request routers (see FIG. 9B), which request routers should register their NI with which higher-level request routers. The DS management unit can make this determination in various ways. For example, it may use network round-trip latencies, physical topologies, or link capacity information to derive an optimal routing configuration. An optimal routing configuration from the DS management unit is then distributed among the DS processing units and request routers (shown only to closest router/units for illustration purposes only). For each routing path indicated by the routing configuration, the configuration may specify: a NI, a physical path identifier, a weighting factor, or a time period FIG. 9A is another schematic block diagram of a DSN memory configuration 901 with processing unit routing. When a DS processing unit is a destination in a routing path, it will monitor the liveness of its link (connection status) to that request router. If it determines the link or associated request router (e.g., shown as 904-1) to be down (e.g., broken link 907), it will notify the DS management unit of the outage and attempt to periodically re-register its connection with that request router. When the DS processing unit becomes aware of a planned future outage or period of unavailability, it can pre-emptively notify the associated request router of this outage such that the request router temporarily unregisters the routing path to that DS processing unit. When a request router is a source in a routing path, it will monitor the liveness of its link (connection status) to that destination network entity (a DS processing unit or request router). If it determines the link or to be down, it will unregister its path to that network entity and stop forwarding requests along that path. It will then await a re-registration by that destination before resuming forwarding of requests along that path.

When a requester issues a request to a DSN memory, that request will contain within it a FDI (a network identifier associated with a collection of at least one DS processing unit). The network will route the request according to routing rules and will eventually be received by a request router. The request router applies a Load Balancing Algorithm (LBA) to the request and its own internal routing information (e.g., a routing table, list of network paths for each NI, etc.).

The LBA may consider weighting factors (relative resource capacities of paths), a stickiness preference (sending requests from same requester along the same path used previously for better caching behavior), or current performance metrics (e.g., which paths have recently demonstrated the fastest response times)). The output of the LBA is a selected path along which to forward the request. Requestor router 904 determines which processing unit of the collection 906 to send a request to by creating a hash based on any of: the source port, source IP, destination port, and destination IP. Because the source ports are ephemeral ports, they will change with every transaction thus creating pseudo-random load balancing. User devices 12, 14, 16 (requester) are assigned one or more requestor routers to send an access request. For example, when assigned to two request routers, there is typically designated one master requester router and one slave requester router. If the Master requester router goes down, the slave becomes master. This also applies for traffic from the processing units to the requester routers.

Figure 9B:
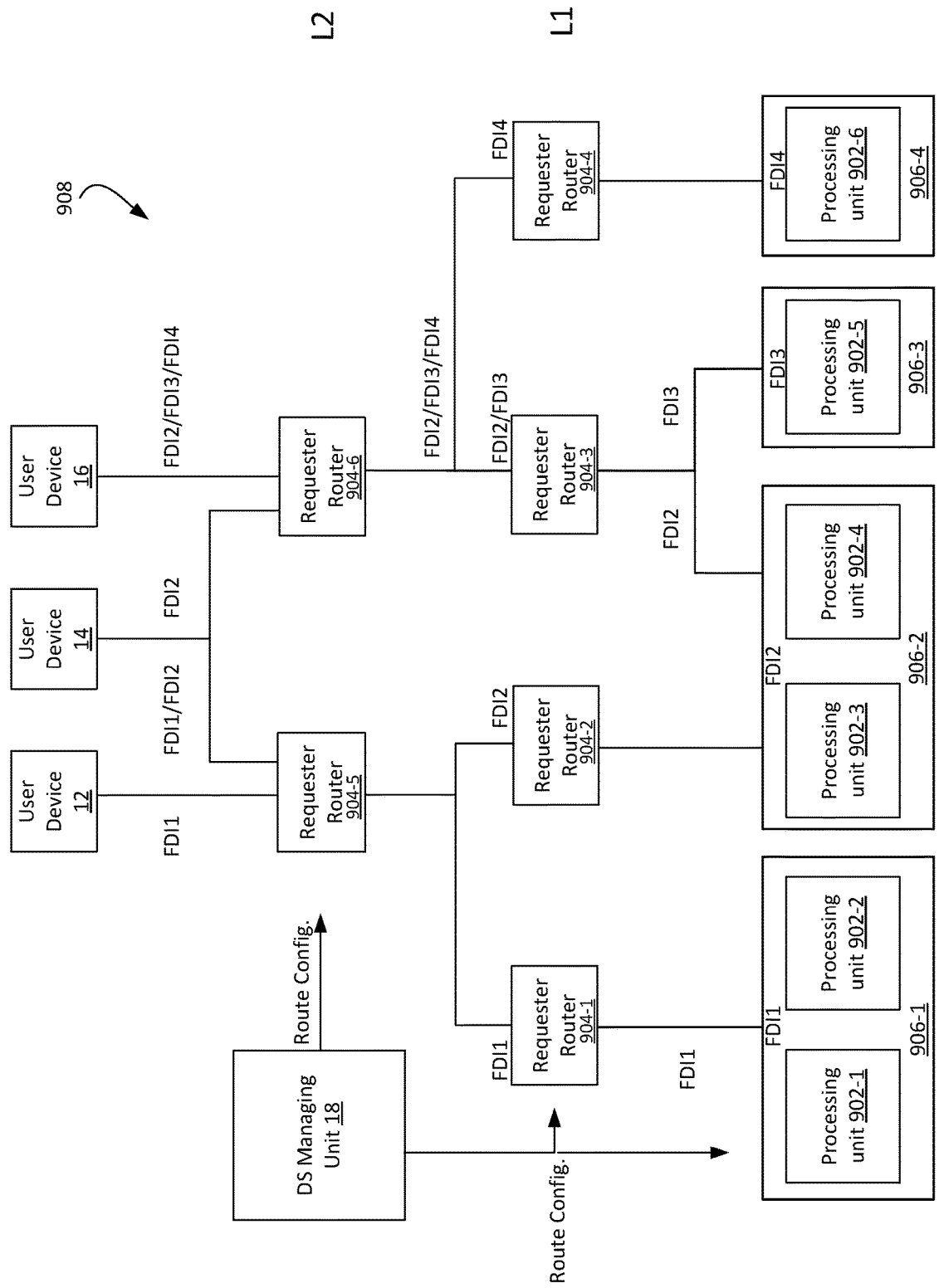
FIG. 9B is yet another schematic block diagram of a DSN memory configuration with processing unit routing in accordance with the present invention.

FIG. 9B is another schematic block diagram of a DSN memory configuration 908 with processing unit routing. As shown in a multi-level hierarchy of request routers, the request may be forwarded to another request router before ultimately reaching a DS processing unit. For example, request routers 904 (1-4) are shown as level 1 (L1) routers and request routers 904 (5-6) are shown level 2 (L2) routers. If the next path is to another requester router, the request router applies the request and its current routing information through its LBA to determine the next path. If the request router forwards the request to a path represented by a DS processing unit, this ends the internal request routing process. The DS processing unit then processes the received request.

This process enables requesters to be ignorant of the capabilities, capacities, number, status or availability of the DS processing units, while at the same time benefit from more intelligent routing and load balancing decisions applied by the request routers.

In various embodiments, the DSN managing unit 18 and/or processing units can be separate units or be integrated with the DSN memory. For example, the DSN managing unit 18 and/or processing units can be located remotely, locally at a DSN storage site or in the storage units 36 themselves.

FIG. 9C is a flowchart 910 illustrating an example of processing unit routing. In particular, a method is presented for use in conjunction with one or more functions and features described in conjunction with FIGS. 1-2, 3-8, and also FIGS. 9, 9A and 9B.

The method begins with step 920 by determining, in advance of a DSN data access request, an optimal routing configuration for a path from the DSN data access request device to a collection of one or more DS processing units. DS management unit 18 determines a desired routing configuration. The routing configuration includes which Network Identifiers (NIs) are associated with which network entities, for example, which DS processing units share a common FDI, which Load Balancing Algorithm (LBA) should be used, which request routers each DS processing unit should register their FDI with, and in a system with multiple layers of request routers (see FIG. 9B), which request routers should register their NI with which higher-level request routers. The DS management unit can make this determination in various ways. For example, it may use network round-trip latencies, physical topologies, or link capacity information to derive an optimal routing configuration.

The method continues, in step 922, by assigning a final destination identifier (FDI) to a collection of one or more DS processing units. For example, a collection of DS processing units shares a common "Final Destination Identifier" (FDI), a logical network address which is shared by at least one DS processing unit.

The method continues, in step 924, by associating a request router with the collection of one or more DS processing units. For example, the DS management unit 18 assigns a request router to a collection of DS processing units.

The method continues, in step 926, by distributing the optimal routing configuration to each of the collection of one or more DS processing units and to the associated request router. For each routing path indicated by the routing configuration, the configuration may specify: a NI, a physical path identifier, a weighting factor, or a time period. When a DS processing unit is a destination in a routing path, it will monitor the liveness of its link (connection status) to that request router. If it determines the link or associated request router to be down (broken link 907), it will notify the DS management unit of the outage and attempt to periodically re-register its connection with that request router. When the DS processing unit becomes aware of a planned future outage or period of unavailability, it can pre-emptively notify the associated request router of this outage such that the request router temporarily unregisters the routing path to that DS processing unit. When a request router is a source in a routing path, it will monitor the liveness of its link to that destination network entity (a DS processing unit or request router). If it determines the link or to be down, it will unregister its path to that network entity and stop forwarding requests along that path. It will then await a re-registration by that destination before resuming forwarding of requests along that path.

The method continues, in step 928, by receiving, by the associated request router, a request to access DSN data located in a DSN memory. When a requester issues a request to a DSN memory, that request will contain within it a FDI (a network identifier associated with a collection of at least one DS processing unit). The network will route the request according to routing rules and will eventually be received by a request router. The request router applies a Load Balancing Algorithm (LBA) to the request and its own internal routing information (e.g., a routing table, list of network paths for each NI, etc.). The LBA may consider weighting factors (relative resource capacities of paths), a stickiness preference (sending requests from same requester along the same path used previously for better caching behavior), or current performance metrics (e.g., which paths have recently demonstrated the fastest response times)). The output of the LBA is a selected path along which to forward the request.

The method continues, in step 930, by routing the DSN data access request to the collection of one or more DS processing units according to the optimal routing configuration. The DS processing units will then process the DSN data access request for a storage unit where the data is presently stored (read) or is to be stored (write).

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   determining, in advance of a DSN data access request, an optimal routing configuration for the DSN data access request to a collection of one or more DS processing units;
   assigning a final destination identifier (FDI) to the collection of one or more DS processing units;

associating a request router with the collection of one or more DS processing units;
distributing the optimal routing configuration to each of the collection of one or more DS processing units and to the associated request router;
determining that a connection between the one or more DS processing units and the associated request router is down;
re-registering the connection between the one or more DS processing units and the associated request router;
receiving, by the associated request router in response to the re-register of the connection, a request to access DSN data located in a DSN memory, wherein the request includes at least the FDI; and
routing, by the request router, the DSN data access request to the collection of one or more DS processing units according to the optimal routing configuration.

2. The method of claim 1, wherein the optimal routing configuration considers one or more of: network identifiers (NIs) associated with specific network entities, load balancing algorithms (LBAs), or one or more associated request routers associated with the collection of the one or more DS processing units and corresponding assigned FDI.

3. The method of claim 2, wherein the network identifiers (NIs) associated with specific network entities include the one or more DS processing units that share a common FDI.

4. The method of claim 1, further comprises multiple layers of request routers.

5. The method of claim 4, wherein the multiple layers of request routers include a lower level with network identifiers (NIs) registered with one or more higher level request routers.

6. The method of claim 1, wherein the determining, in advance of the DSN data access request, the optimal routing configuration is based on one or more of: network round-trip latencies, physical topologies, or link capacity information.

7. The method of claim 1, wherein the optimal routing configuration indicates a routing path which includes one or more of: a network identifier (NI), a physical path identifier, a weighting factor, or a time period.

8. The method of claim 1, further comprises monitoring, by each of the one or more DS processing units, a connection status to the associated request router.

9. The method of claim 1, further comprises monitoring, by one or more request routers, a connection status to the collection of the one or more DS processing units.

10. The method of claim 1, wherein, when the one or more DS processing units become aware of a planned future outage or period of unavailability, pre-emptively notifying an associated request router of this outage such that the associated request router temporarily unregisters a routing path in the optimal routing configuration to the one or more DS processing units.

11. The method of claim 1 further comprises, when the associated request router is a source in a routing path in the optimal routing configuration, monitoring a connection status of its link to that destination network entity.

12. The method of claim 1, further comprises, in response to the down connection, notifying a DS management unit of a down connection status for the re-registering of the connection with the associated request router.

13. The method of claim 1 further comprises, in response to the down connection, awaiting a re-registration of the connection between the one or more DS processing units and the associated request router before resuming forwarding of requests along a path of the down connection.

14. The method of claim 13, further comprises waiting a time period to re-register before resuming forwarding of requests along the routing path.

15. A computing device of a group of computing devices of a dispersed storage network (DSN), the computing device comprises:
an interface;
a local memory; and
a processing module operably coupled to the interface and the local memory, wherein the processing module functions to:
determine, in advance of a DSN data access request, an optimal routing configuration for the DSN data access request to a collection of one or more DS processing units;
assign a final destination identifier (FDI) to the collection of one or more DS processing units;
associate a request router with the collection of one or more DS processing units;
distribute the optimal routing configuration to each of the collection of one or more DS processing units and to the associated request router;
determine that a connection between the one or more DS processing units and the associated request router is down;
re-register the connection between the one or more DS processing units and the associated request router;
receive, by the associated request router, a request to access DSN data located in a DSN memory, wherein the request includes at least the FDI; and
route, by the request router, the DSN data access request to the collection of one or more DS processing units according to the optimal routing configuration.

16. The computing device of claim 15, wherein the optimal routing configuration considers one or more of: network identifiers (NIs) associated with specific network entities, load balancing algorithms (LBAs), or one or more associated request routers associated with the collection of the one or more DS processing units and corresponding assigned FDI.

17. The computing device of claim 16, wherein the network identifiers (NIs) associated with the specific network entities includes the one or more DS processing units that share a common FDI.

18. The computing device of claim 15, further comprises multiple layers of request routers.

19. The computing device of claim 18, wherein the multiple layers of request routers include a lower level with network identifiers (NIs) registered with one or more higher level request routers.

20. A dispersed storage network (DSN) comprises:
an interface;
a local memory; and
a processing module operably coupled to the interface and the local memory, wherein the processing module functions to:
determine, in advance of a DSN data access request, an optimal routing configuration for the DSN data access request to a collection of one or more DS processing units;
assign a final destination identifier (FDI) to the collection of one or more DS processing units;
associate a request router with the collection of one or more DS processing units;

distribute the optimal routing configuration to each of the collection of one or more DS processing units and to the associated request router;

determine that a connection between the one or more DS processing units and the associated request router is down;

re-register the connection between the one or more DS processing units and the associated request router;

receive, by the associated request router, a request to access DSN data located in a DSN memory, wherein the request includes at least the FDI; and route, by the request router, the DSN data access request to the collection of one or more DS processing units according to the optimal routing configuration.

* * * * *